United States Patent [19]
Gay et al.

[11] 3,933,520
[45] Jan. 20, 1976

[54] METHOD OF PREPARING ELECTRODES WITH POROUS CURRENT COLLECTOR STRUCTURES AND SOLID REACTANTS FOR SECONDARY ELECTROCHEMICAL CELLS

[75] Inventors: Eddie C. Gay, Park Forest; Fredric J. Martino, Riverdale, both of Ill.

[73] Assignee: The United States of America as represented by the United States Energy Research and Development Administration, Washington, D.C.

[22] Filed: Apr. 3, 1975

[21] Appl. No.: 565,021

[52] U.S. Cl................ 136/6 LF; 136/20; 136/75
[51] Int. Cl.²................ H01M 35/00; H01M 43/00
[58] Field of Search......... 136/6 LF, 6 R, 6 F, 83 R, 136/83 T, 100 R, 137, 20, 75, 175, 67, 176, 120 R

[56]         References Cited
         UNITED STATES PATENTS

| | | |
|---|---|---|
| 3,531,324 | 9/1970 | Fischer et al. ................. 136/20 |
| 3,833,421 | 9/1974 | Rubischko et al. ............. 136/6 LF |
| 3,887,396 | 6/1975 | Walsh et al. ................... 136/6 L |
| 3,894,887 | 7/1975 | England ......................... 136/83 R |

*Primary Examiner*—Anthony Skapars
*Attorney, Agent, or Firm*—Dean E. Carlson; Arthur A. Churm; Hugh W. Glenn

[57]         ABSTRACT

Particulate electrode reactants, for instance transition metal sulfides for the positive electrodes and lithium alloys for the negative electrodes, are vibratorily compacted into porous, electrically conductive structures. Structures of high porosity support sufficient reactant material to provide high cell capacity per unit weight while serving as an electrical current collector to improve the utilization of reactant materials. Pore sizes of the structure and particle sizes of the reactant material are selected to permit uniform vibratory loading of the substrate without settling of the reactant material during cycling.

16 Claims, 7 Drawing Figures

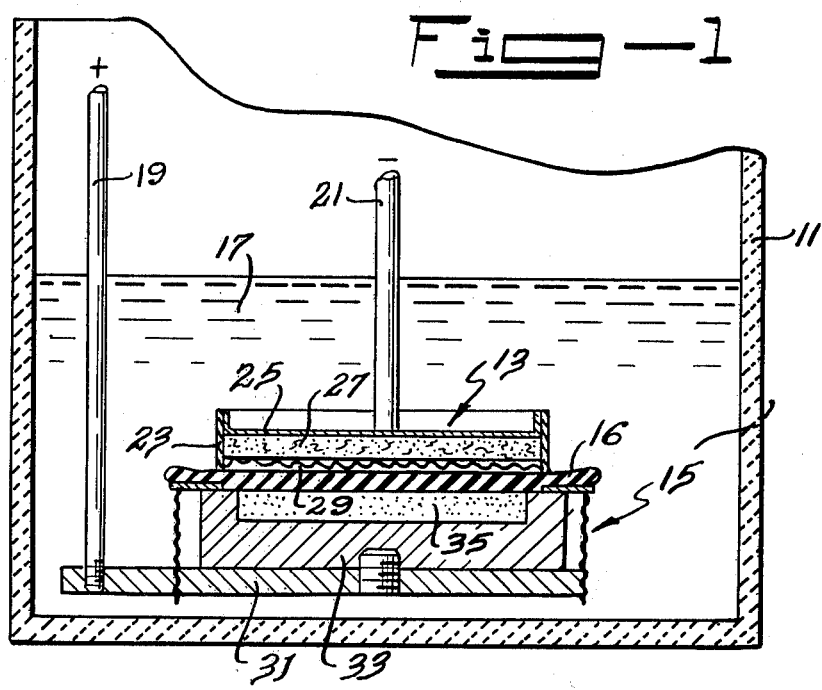
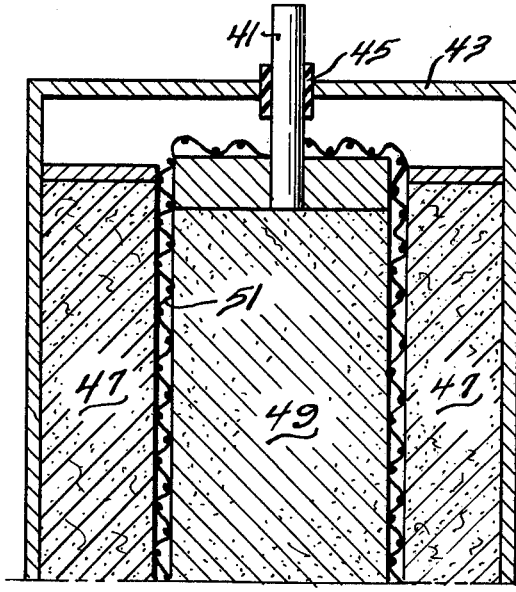
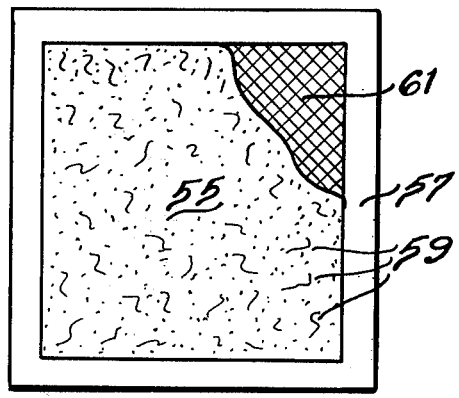
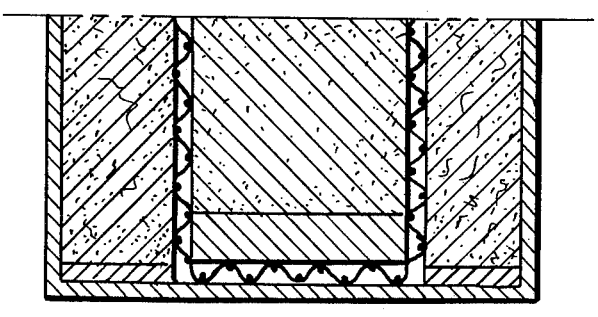
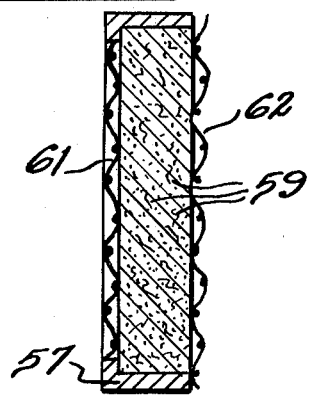

METHOD OF PREPARING ELECTRODES WITH POROUS CURRENT COLLECTOR STRUCTURES AND SOLID REACTANTS FOR SECONDARY ELECTROCHEMICAL CELLS

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to the preparation of both positive and negative electrodes for use in high-temperature secondary electrochemical cells and batteries that can be employed as power sources for electric automobiles and for the storage of electric energy generated during intervals of off-peak power consumption. A substantial amount of work has been done in the development of such electrochemical cells and their electrodes. The cells showing the most promise employ alkali metal and alkali metal alloys as anodes, molten salt electrolytes containing the alkali metal ions and cathode materials of Groups VIA and VIIA of the Periodic Chart, the chalcogens and halogens. Sulfur, transition metal sulfides and other metal sulfides are often selected as the positive electrode reactant, while lithium, sodium and lithium-aluminum alloys are examples of reactants for the negative electrode.

Examples of such secondary cells and their various components are disclosed in U.S. Pat. Nos. 3,827,910 to Cairns et al., entitled "Homogeneous Cathode Mixtures for Secondary Electrochemical Power-Producing Cells," Aug. 6, 1974; 3,833,421 to Rubischko et al., entitled "Secondary Electrochemical Cells with a Chalcogen Cathode," Sept. 3, 1974; and 3,716,409 to Cairns et al., entitled "Cathodes for Secondary Electrochemical Power-Producing Cells," Feb. 13, 1973. Various other secondary electrochemical cells are described in U.S. Pat. Nos. 3,907,589, Sept. 23, 1975 by Gay et al. entitled "Cathodes for a Secondary Electrochemical Cell"; and 3,887,396, June 3, 1975 by Walsh et al. entitled "Modular Electrochemical Cell." Each of these patents is assigned to the assignee of the present application.

A large number of factors and variables affect the performance of high-temperature secondary cells of this type. Some very important considerations have been the reactant compositions and the structure of the electrodes. A number of fairly successful electrode compositions and structures are described in the above-cited patents and patent applications. Molten reactant materials such as sulfur in the positive electrode and lithium in the negative electrode have been sorbed or loaded along with electrolyte into electrically conductive porous substrate materials for use as the respective electrodes. Cells prepared of electrodes of this type have provided high specific energy (watt-hr/gm) and high specific power (watt/gm) but have had the disadvantage of limited life due to loss of the reactant materials from the electrodes and corrosion of the cell structure materials.

Other electrochemical cells have included electrodes having reactant materials in the form of solid particles blended with particles of electrically conductive material and electrolyte. Such type compositions have often been used in the positive electrodes with materials such as particulate transition metal sulfides, e.g. $FeS_2$, FeS and $CuS_2$, often blended with a particulate elecrically conductive material such as powdered carbon, carbon black or powdered iron. Compositions of these types are contained within high-temperature fabrics such as boron nitride with structural integrity and current collection imparted by embedded mesh and/or outer baskets of electrically conductive material such as iron or molybdenum.

These electrodes have functioned reasonably well in a horizontal orientation but electrode materials can be expected to sag or settle to the bottom in vertical alignments. In addition, the percentage utilization of active material and capacity at high currents has been found to be severely limited when electrodes in excess of ½ cm thickness are employed. Negative electrodes of such as electrochemically prepared Li-Al alloy also suffer from these limitations in capacity when increased thicknesses are provided in order to increase the loading of electrode reactant. Additional problems have arisen from the swelling and distortion of electrodes, partially as a result of inhomogeneous loading of the electrode volume with active material. This has been one of the continuing difficulties with positive electrodes employing such as $FeS_2$ or FeS as the reactant material with embedded mesh current collectors. Also severe swelling occurs during electrochemical formation of Li-Al electrodes from molten lithium and compressed aluminum plaques.

SUMMARY OF THE INVENTION

Therefore, in view of these problems still existing in the preparation of electrodes for secondary electrochemical cells, it is an object of the present invention to provide an improved method of preparing electrodes with reactant materials that are solid at the cell operating temperatures.

It is also an object to provide a method of uniformly loading particulate electrode materials into a porous solid structure for use in secondary electrochemical cells.

It is also an object to provide a method of preparing generally flat electrodes containing particulate reactant material for use in vertical arrangements within electrochemical cells with minimized reactant settling.

It is a further object to provide an electrochemical cell employing these novel electrode structures.

In accordance with the present invention, particulate reactant material is distributed over an outer major surface of a flat, electrically conductive, porous substrate. The substrate is vibrated at a sufficient frequency and amplitude for a sufficient period of time to load the reactant material into the void volume of the substrate. The substrate as loaded with the electrode reactant is then submerged in molten electrolytic salt to fill substantially all of the remaining void volume of the substrate.

The electrode as thus produced is an integral, porous substrate structure of electrically conductive material having solid particles of electrode reactant contained throughout its void volume. The electrode structure thus provides support and current collection for the electrode reactant material distributed therein.

BRIEF DESCRIPTION OF THE DRAWINGS

The present invention is illustrated in the accompanying drawings wherein:

FIG. 1 is an elevation view in cross section of a laboratory electrochemical cell used to test the present invention.

FIG. 2 is a cross-sectional view of an electrochemical cell with vertically arranged electrodes.

FIG. 3 is an elevation view of an electrode that could be employed in the cell of FIG. 2.

FIG. 3A is a cross section of the electrode of FIG. 3.

DETAILED DESCRIPTION OF THE PREFERRED EMBODIMENT

Figure 4:
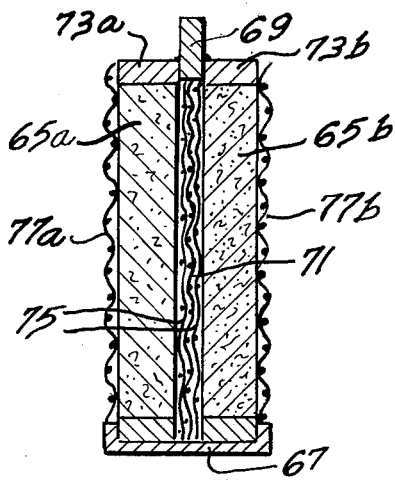
FIG. 4 is an alternate electrode in cross section that could also be employed in the cell of FIG. 2.

In FIG. 1, an electrochemical cell is shown contained within a ceramic crucible 11. The cell includes an anode 13 (negative electrode) and a cathode 15 (positive electrode) submerged within a molten salt electrolyte 17. Electrical conductors 19 and 21 extend from the cathode and anode, respectively, for connection to electrical instrumentation (not shown) for evaluating the cell. An interelectrode separator 16 of porous electronically insulative material separates the positive and negative electrodes while permitting ionic current flow during operation of the cell.

The negative electrode 13 is held within a support ring 23 and a cover 25 in electrical communication with conductor 21. The active electrode material is vibratorily compacted within a porous substrate 27 of electrically conductive material that is tightly fitted into ring 23. A porous retainer sheet 29 covers the lower surface of substrate 27.

The cathode 15 is made up of an electrically conductive, electrochemically inert base structure 31, for instance of molybdenum, that supports and makes electrical contact between conductor 19 and a cathode housing or cup 33. Cup 33 is of a porous electrically conductive material that is of sufficient density to provide structural strength and support to a substrate 35 of high porosity that contains the active, positive electrode reactant.

The electrolyte 17 that surrounds the two electrodes can be a eutectic salt composition that is molten at the cell operating temperature (350°–500°C.) Electrolytes, such as the eutectic compositions of LiCl-KCl or LiCl-LiF-KCl salts, have been found to be suitable for this purpose. Various other suitable electrolytic salts can be selected from those listed in the published literature such as the Unites States patents cited above.

In practice, various cell designs may be used with the improved electrodes of the present invention. The cell of FIG. 1 merely represents an example of the type of cell used experimentally to test and prove the operability of the present invention. One other cell design which could be used in making up electrochemical batteries for off-peak storage of electrical power or as a power source for an electric vehicle is illustrated and described in the assignee's copending patent application Ser. No. 416,311 cited above.

One other cell configuration to which the electrodes of the present invention are particularly applicable is shown in FIG. 2. This cell employs electrodes within a vertical alignment with the electrode terminals illustrated by terminal 41 at the upper portion of the cell housing 43. This permits the level of molten electrolyte (not shown) to be below the level of the electrical feedthrough 45. Consequently, feedthrough corrosion problems can be minimized. However, it is essential that sagging or settling of active material within the electrodes as a result of gravity or jarring forces be eliminated. This is to be accomplished through use of vibratory loading of the active material into porous, electrically conductive substrates.

FIG. 2 illustrates three electrodes in simplified form within an electrochemical cell. Two negative electrodes 47 are positioned parallel to and on either side of a positive electrode 49. The major surfaces of the electrodes, that is, the surfaces with largest area, are normal to the plane of the drawing and form the interelectrode interfaces. Electrical separation between the electrodes is maintained by a porous, electronically insulative cloth 51 of such as boron nitride. The two negative electrodes 47 make electrical contact with the cell housing 43 which can be provided with a second electrical terminal at a convenient location (not shown), for instance in line with positive electrode terminal 41.

A more detailed description of electrodes that can be employed within an electrochemical cell such as that shown in FIG. 2 are illustrated in FIGS. 3, 3A and 4. FIGS. 3 and 3A illustrate an electrode that could be used as the negative electrode in a vertically aligned electrochemical cell with a major surface that would face an opposite electrode or the cell housing shown in FIG. 3. This electrode includes a substrate 55 of high porosity, preferable of 90 to 99 percent porosity, surrounded by a structural support ring 57. Particles of reactant material 59 are illustrated homogeneously distributed throughout the porous substrate. The particles have been previously vibratorily loaded or compacted into the substrate in accordance with the present invention. An electrically conductive screen 61 and, in some cases, a fine cloth is positioned over one surface of the substrate prior to the vibratory loading to retain the reactant particles 59. A second electrically conductive screen 62 on the opposite surface is attached into position after the loading for retention of particles as well as to serve as a supplemental current collector during the cell operation.

Substrate 55 can comprise more than one layer of material where relatively thick electrodes are desired. This may be done to permit vibratory loading of the substrate in layers or merely to provide electrodes of increased thickness over that of available metallic foam materials.

Another electrode cross section is illustrated in FIG. 4 that could be used as the central, positive electrode of the FIG. 2 electrochemical cell. Two porous substrate portions 65a and 65b are illustrated clamped together as at 67 on either side of the electrode terminal 69. The major electrode surfaces of relatively large area that would ordinarily face the opposite electrodes of the cell are aligned perpendicular to the plane of the drawing. The outer margins of substrates 65a and 65b include structural ring portions 73a and 73b of high strength and density. In the case of vitreous carbon foam and other carbon foam substrates, structural rings 73a and 73b can be integral with the remainder of the substrate body. This can be accomplished by compressing marginal portions of a polyurethane foam layer during carbonization in the formation of vitreous carbon foam.

Electrode terminal 69 is installed in firm electrical contact with structural ring portions 73a and 73b. The structural rings in turn are attached in electrical contact with electrically conducting metallic mesh 77a and 77b that are layered over outer major surfaces of the substrate facing the opposing electrodes. Metallic mesh 77a and 77b can be sufficiently fine to retain the particular reactant material or they can be combined with an under layer of a conductive fabric such as carbon cloth (not shown) for this purpose. Mesh 77a and 77b, e.g. of molybdenum with FeS₂ cathode reactant, serve to enhance current collection and the structural strength of the electrode.

A second metallic mesh 71 is disposed between porous substrates 65a and 65b in electrical communication with terminal 69. Porous ceramic fabrics 75 of electrically insulative material (e.g. zirconium cloth) are layered over and in contact with the inwardly facing, major surfaces of substrates 65a and 65b on opposite sides of mesh 71.

These insulative cloths 75 bias the electrode reaction from the inwardly facing towards the outwardly facing, major substrate surfaces that contact electrically conducting mesh 77a an 77b. This electrode design is of particular value with electrode reactants, such as FeS₂ and FeS which generate reaction products (e.g. Li₂S) of increased volume during cycling.

By employing electrically conductive fabrics such as carbon cloth or fine metallic mesh on the outer major surfaces of the electrode and electronically insulative fabrics on the inner major surfaces, more favorable reaction sites are provided at the outer surfaces. Thus the discharge reaction will begin at the two outer major surfaces and proceed inwardly, with reaction product displacing electrolyte into the electrode center. The insulative fabrics 75 and mesh 71 between the inner major surfaces of substrates 65a and 65b provide an electrolyte displacement channel from the electrode center. This electrode is substantial improvement over electrode designs in which the reaction is permitted to initiate from all exposed surfaces and thereby entrap electrolyte as a result of reaction product formation.

The porous substrate materials for both the positive and negative electrodes illustrated in FIGS. 1–4 are both of high porosity to permit adequate loading of active electrode material in high amp-hour capacity cells. The substrates are of an electronically conductive material so as to serve as a current collector at reaction sites of active material and electrolyte. The pores of the material are sufficiently large and sufficiently interconnected to permit a fairly uniform loading and distribution of the active material as well as permeation of molten electrolyte to the active material. However, the substrate pores must not be excessively large and must contain sufficient interstitial trappings and convolutions to fairly maintain loose, particulate, active material in a uniform distribution in respect to the major surfaces of the substrate during operation of the cell.

Various commercially available metallic and carbonaceous foams and felts can be employed as the substrate materials. The foamed substrate materials are generally preferred due to the high porosity obtainable within a single, integral structure. Table I lists a number of materials that are suitable for use as the positive or the negative electrode substrates.

TABLE I

| Material | Porosity % Void Volume | Ave. Pore Size microns |
|---|---|---|
| Foams[1] | | |
| Fe | 90–99 | 125–250 |
| Ni | 90–99 | 125–250 |
| Mo | 70–82 | 100–200 |
| Cr | 65 | 100–200 |
| Nb | 75 | — |
| Vitreous carbon | 90–99 | 200–300 |
| Graphite | 48–92 | 100–200 |
| Felts | | |
| Steel wool | | |
| Carbon felt | | |

[1]Many of the metallic foams such as Fe and Ni are commercially available under the trademark Retimet.

In selecting a porous substrate material for use in a particular electrode, the electrochemical reactivity of the material must be considered. In the positive electrode, several of the metallic materials may be unsuitable for use. For instance, if FeS₂ is selected as the positive electrode reactant, then iron or nickel could not be employed. For this particular positive electrode reactant, vitreous carbon foam appears to be the preferred substrate material.

The porosity of the substrate is selected as high as possible consistent with structural integrity. Some metallic and vitreous carbon foams of up to near 99 percent porosity have been found to be suitable with auxiliary structural supports as described above.

In order to prepare an electrode in accordance with the present development, a generally flat, sheet-like porous substrate of the type described above having a thickness of, for instance, ½ to 2 cm is provided. More than one sheet of the material such as iron or nickel Retimet (a trademark) can be used as stacked layers within a single porous substrate. This material is cut slightly oversize to that desired in major surface area in order to form a force fit into a support ring such as that shown at 23 in FIG. 1 or the porous carbon cup illustrated at 33. Where the ring type support structures are employed, a fine cloth or screen is attached across the bottom of the substrate to avoid leakage during loading of the active electrode material.

Particulate electrode reactant material, for instance of Li-Al alloy for the negative electrode of FeS₂ for the positive electrode, is prepared for loading into the porous structure. Li-Al alloys of 40 to 60 atom % lithium are readily prepared by a metallurigical process completely described in the assignee's copending application entitled "Method of Preparing an Electrode of Lithium-Aluminum Alloy", ERDA case No. S-44,364, Ser. No. 481,285, filed June 20, 1974. This application is hereby expressly incorporated by reference. Particulate electrode material provided by this method or otherwise obtained is mechanically ground where necessary to an average particle size that is slightly smaller than the average pore size selected in the electrode substrate material. For example, metallurgically prepared Li-Al alloy is provided with average particle sizes of about 200 microns in a range about 80 to 250 microns with less than about 10 percent by weight of less than 100 microns for loading into an iron Retimet structure having a porosity of between 93 and 95 percent porosity and average pore sizes of about 125 and 250 microns. Positive electrode materials such as FeS₂ (iron pyrite) are sized at about 150 to 300 microns for loading into such as a 98 percent porosity vitreous carbon foam having average pore sizes of 200 to 300 microns.

In loading the particulate reactant material into the porous substrate structure, less than about 1 cm thick layers are prepared at a time. Substrate layers much in excess of 0.8 to 1 cm in thickness tend to produce an irregular sized distribution of the particulate reactant material. The reactant particles are uniformly spread over the exposed surface of the porous substrate and the supporting ring or cup containing the substrate is vibrated at an effective frequency and amplitude for a sufficient period of time to uniformly load or impregnate the reactant particles into the interstitial openings within the substrate.

Various amounts of reactant can be loaded into a substrate depending on the electrode to be prepared. Substrates of 90 to 99 percent initial porosity are contemplated with sufficient loading of reactant to provide a porosity of 20 to 70 percent prior to filling with electrolyte. Some electrode reactants, such as Li-Al alloy, in the negative electrode do not undergo substantial volume increase on discharge of the cell. These reactants can be loaded to fill a major portion that is between one-half and three-fourths of the void volume in the porous substrate. This can generally be accomplished by providing excess reactant material on a major surface and vibrating the substrate until no more particulate material is taken up. Other electrode reactants such as $FeS_2$ and $FeS$ in the positive electrode generate a reaction product (e.g. $Li_2S$) of greater volume than the reactant on discharge. In loading porous substrates for the preparation of these electrodes, a smaller or minor fraction, that is between one-fourth and one-half, of the void volume is filled in order to provide sufficient space for accommodating the reaction product. This is accomplished by measuring the required amount of reactant onto a major surface in uniform distribution and vibrating the substrate until the reactant material is uniformly taken up in respect to that major surface.

Metallurgically prepared Li-Al particles of the above given size distribution have been fairly uniformly distributed into two layers of nickel Retimet each of 0.38 cm thickness, 95 percent porosity and having average pore sizes of about 125 to 250 microns by vibrating the support ring and substrate at a frequency of about 100 to 150 cycles per second, an amplitude of about 0.02 to 0.1 cm for a period of about 30 to 120 seconds. Foamed iron and vitreous carbon substrates have also been loaded in this manner. Vibratory treatment can be provided with a number of commercially available devices. For example, an electric engraver such as a Dremel Model 290 can be used. The final step in preparing the electrode occurs after assembly within the electrochemical cell. At that time, the remaining void volume of the electrode is filled with molten electrolyte salt to permit the necessary electrochemical interaction with the opposite electrodes within the cell.

One typical negative electrode that was prepared for use in the experimental electrochemical cell shown in FIG. 1 included a porous substrate formed of two layers of iron Retimet (a Trademark) material having a combined thickness of 0.78 cm, weighing a total of 8.3 grams and each being of about 5 cm in diameter and 93.4 percent porosity. The substrate was loaded with 13.1 grams of 51 atom % lithium in a Li-Al alloy composition. The completed electrode included 48.4 vol. % Li-Al alloy, 6.6 vol. % iron from the Retimet material and 45 vol. % electrolyte, assuming that all of the void volume was filled. In preparing this electrode, excess particulate Li-Al was provided on the surface of the substrate and vibration continued until the loading nearly ended, at which time the excess particulate material was removed.

In contrast, a typical positive electrode containing a reactant such as $FeS_2$ is loaded to contain about 34 vol. % reactant, 64 vol. % electrolyte and 2 vol. % carbon in a vitreous carbon foam substrate. The substrate will be about 0.5 to 2.0 cm in thickness and be only partially filled with particulate reactant during the vibrator loading step.

Although the above discussion mentions only Li-Al and iron disulfide as electrode reactant materials, it will be clear that various other types of materials can be similarly loaded into such substrates. This electrode preparation method is particularly applicable to reactant materials that are normally solid at the operating temperature of the electrochemical cell. Other positive electrode materials that might be vibratorily loaded in particulate form into a porous substrate structure include transition metal sulfides and other metal sulfides such as $FeS$, $CoS_2$, $Co_3S_4$, $NiS$, $CuS$, $Cu_2S$, $Sb_2S_3$, $TiS_2$, $V_2S_3$, $Cr_2S_3$, $MnS$, $ZnS$, $CdS$, $TaS_2$ and combinations of these materials. Many of these materials have melting points or decompose in the of 500° to 1800°C. or substantially above the electrolyte melting point and the normal operating temperatures (350°–500°C.) of the alkali metal/molten salt/metallic sulfide cells.

In the negative electrode, various high melting point alloys, that is with melting temperatures above cell operating temperatures, of lithium-aluminum, lithium-silicon, lithium-silicon-aluminum, lithium-boron and other alloys of alkali metals and alkali earth metals as well as mixtures of these alloys could be loaded into the electrode structures by this technique.

The following examples are presented to illustrate the performance of electrodes prepared in accordance with the present invention. These examples give performance of an electrochemical cell similar to that illustrated in FIG. 1.

EXAMPLE I

Positive Electrode

Figure 5:
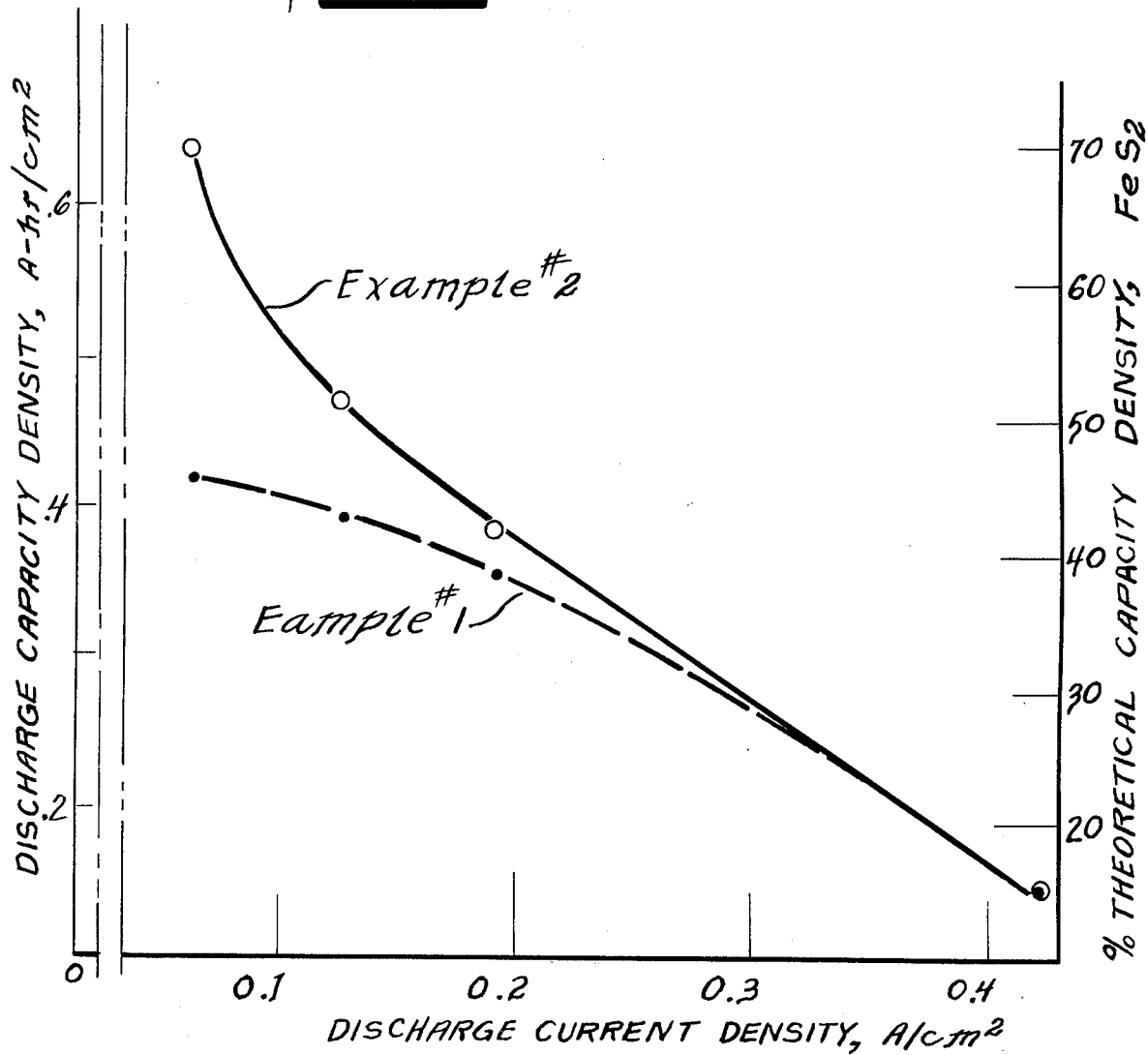
FIG. 5 is a graph showing discharge capacity density v current density for the cells described in Examples I and II.

Particulate $FeS_2$ in sufficient amount to provide a theoretical capacity density of 0.92 amp-hrs/cm² (16.1 grams) is loaded into a porous vitreous carbon substrate of about 98 percent porosity in the manner described above. The substrate is about 5 cm in diameter and 0.5 cm thick and is tightly fitter into a porous graphite cup of greater strength and lower porosity, as is illustrated in the drawing in FIG. 1. This positive electrode is operated opposite a negative electrode of similar diameter and approximately 0.32 cm thick. The negative electrode is electrochemically prepared by a method similar to that described in the patent application entitled "Modular Electrochemical Cell", Ser. No. 416,311, cited above. In this method, sufficient lithium is electroplated onto a porous aluminum structure with stainless steel current collector interwoven therein to provide a theoretical capacity density of 0.43 amp-hrs/cm² based on lithium. The cell was operated at about 400°C. for over 360 hours and 35 cycles. Its most impressive performance was that of 0.147 amp-hrs/cm² (corresponding to 32.2 percent of the Li-Al theoretical capacity density) at a discharge current density of 0.425 amp/cm$^2$. This high current density was sustained for 20.7 minutes. Other performance values for this cell are shown in the graph of FIG. 5.

EXAMPLE II

Negative Electrode

The same positive electrode was employed opposite a negative electrode having 60 atom % lithium in Li-Al alloy that was metallurgically prepared, vibratorily loaded into a substrate of about 95 percent porosity and 1.62 cm thick nickel foam. Sufficient lithium was provided for a theoretical capacity density of 1.55 amp-hr/cm$^2$. The cell was operated for 7 cycles and 144 hours with its performance also shown in FIG. 5.

EXAMPLE III

Negative Electrode of Reduced Thickness

Figure 6:
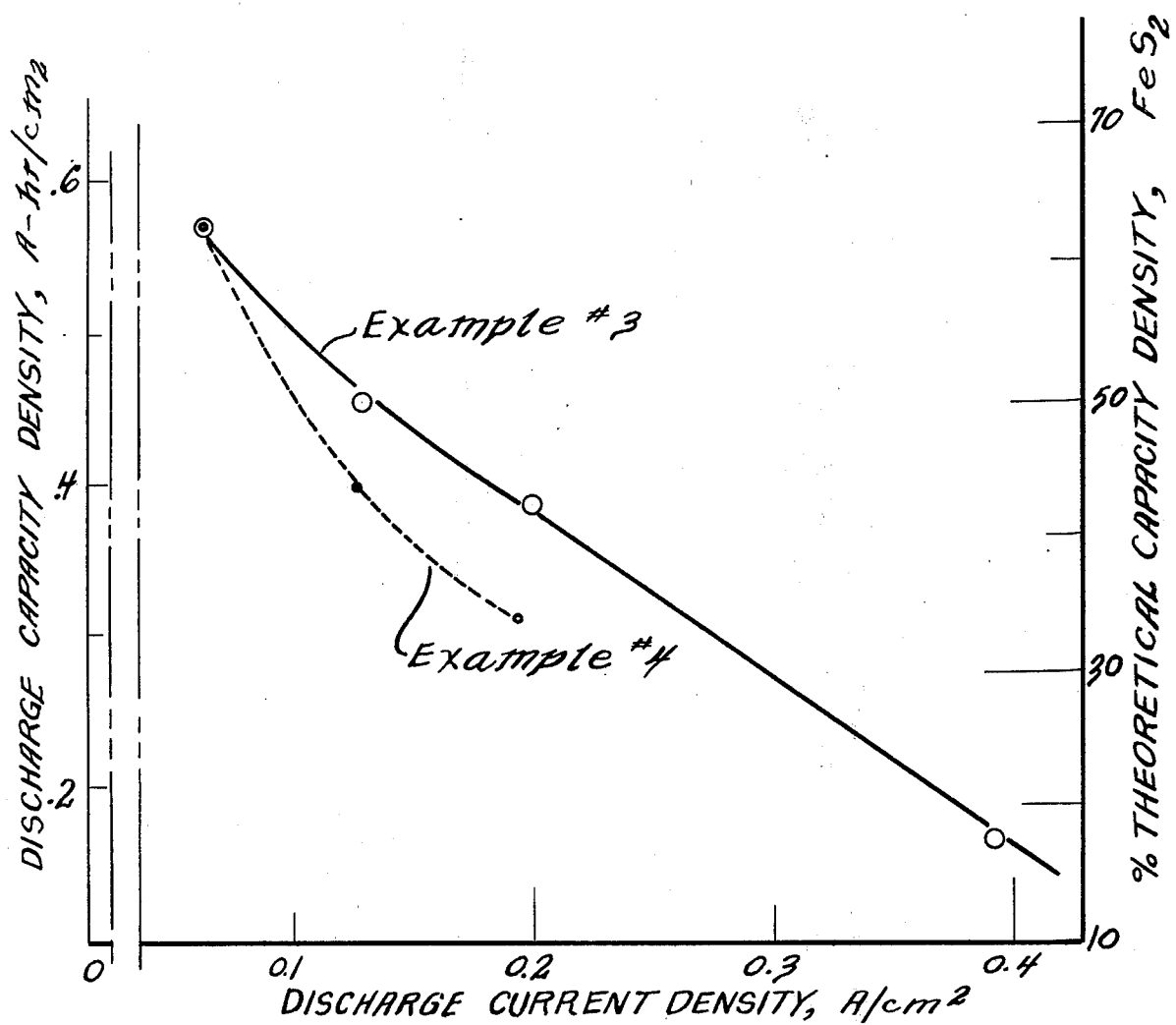
FIG. 6 is a graph showing the same variables as FIG. 5 for the cells described in Examples III and IV.

The same positive electrode was operated opposite a negatve electrode similar to that described in Example II except the foam nickel thickness was only 0.8 cm and the lithium-aluminum loading corresponded to only 0.73 amp-hr/cm$^2$ with 51 atom % lithium in the Li-Al alloy. The loading left 46.2 vol. % for electrolyte. The performance of this cell is also shown in FIG. 6.

EXAMPLE IV

Comparative Negative Electrode

An electrochemically prepared negative electrode of 0.6 cm thickness, 0.76 amp-hr/cm$^2$ and 40 vol. % for electrolyte is operated opposite the same positive electrode of Examples I, II, and III. The results are also shown in FIG. 6, illustrating that at comparable loading and thickness the capactiy density of an electrochemically prepared electrode falls off much more rapidly than that of electrodes prepared by the method of the present invention.

It will be seen from the foregoing description and examples that the present invention provides improved electrodes and a method of their preparation which can use solid particulate reactant material within high-temperature electrochemical cells having molten electrolyte. These electrodes provide improved current collection along with resulting improved capacity density of the cell. The method allows an increased and uniform loading of particulate reactant material within an electrode. When the electrode is used in a vertical position, the reactant particles are supported to extend the cell life by preventing slumping of the active material and the formation of an inhomogeneous distribution within the electrode.

The embodiments of the invention in which an exclusive property or privilege is claimed are defined as follows:

1. A method of preparing an electrode for use in a high-temperature, secondary, electrochemical cell comprising distributing solid, particulate, electrode, reactant material over an upper surface of an electrically conductive, porous substrate; vibrating said substrate to impregnate said reactant material into a portion of the void volume of said porous substrate; and filling substantially all of the remaining void volume of said substrate with molten electolytic salt.

2. The method of claim 1 wherein said reactant particles are uniformly distributed in a measured amount over a major surface of said substrate and vibrated for a sufficient period to impregnate substantially all particles of reactant uniformly with respect to said major surface of said substrate.

3. The electrochemical cell of claim 1 wherein said electrode is a positive electrode of said secondary electrochemical cell and said reactant material impregnated into said porous substrate comprises a metal sulfide in sufficient volume to occupy between one-fourth and one-half the void volume of said substrate.

4. The method of claim 1 wherein said electrode is a negative electrode of said secondary electrochemical cell and said reactant material impregnated into said porous substrate is a metallic alloy of an alkali metal in sufficient volume to occupy between one-half and three-fourths the void volume of said substrate.

5. The method of claim 1 wherein said substrate is vibrated at a frequency of about 100 to 150 cycles per second and an amplitude of about 0.02 to 0.1 cm for about 30 to 120 seconds.

6. The method of claim 1 wherein said substrate is of 90 to 99 percent porosity prior to said vibrating step and is filled with said particulate reactant material to obtain a porosity of about 20 to 70 percent prior to filling with said electrolytic salt.

7. An electrode prepared by the method of claim 1.

8. In a secondary, high-temperature, electrochemical cell including an alkali metal alloy reactant in the negative electrode, a metal sulfide reactant in the positive electrode, and a molten electrolyte containing ions of said alkali metal, the improvement wherein at least one of said electrodes comprises an integral, porous substrate of electrically conductive material impregnable by said molten electrolyte and having solid particles of reactant distributed throughout the void volume of said substrate.

9. The electrochemical cell of claim 8 wherein said electrode substrate is of a foamed electrically conductive material selected from the group of foamed materials consisting of vitreous carbon foam, graphite foam, iron foam, nickel foam, molybdenum foam, niobium foam and chromium foam.

10. The electrochemical cell of claim 8 wherein said electrode substrate is of flat shape with two major opposing surfaces defining a thickness therebetween, said solid particles of reactant being uniformly distributed in respect to said major surfaces into said substrate.

11. The electrochemical cell of claim 8 wherein said electrode substrate being of flat configuration with opposing major surfaces defining a thickness therebetween, said substrate having a central volume portion circumscribed by marginal volume portions extending through the thickness of said substrate between said major surfaces, said central volume portion being of greater porosity and lesser structural strength than said marginal volume portion and said central portion containing most of said solid particles of reactant contained within said substrate.

12. The electrochemical cell of claim 8 wherein said solid particles of reactant having a melting point in excess of the melting point of said molten electrolyte.

13. The electrochemical cell of claim 8 wherein said porous substrate having interconnected pores of about 100 to 300 microns pore size and a porosity of about 90 to 99 percent excluding said electrolyte and reactant, and said reactant being in the form of solid particles of about 100 to 300 microns size.

14. The electrochemical cell of claim 8 wherein said electrode is a positive electrode and said reactant material is a metal sulfide having a melting point between 500 and 1800°C., and said electrolyte within said cell having a melting point below 500°C.

15. The electrochemical cell of claim 8 wherein said electrode is a negative electrode and said particles of reactant materials are selected from the group of alkali metal alloys consisting of lithium-aluminum, lithium-silicon-aluminum and lithium-silicon having melting temperatures above 500°C., and said electrolyte within said cell having a melting point below 500°C.

16. The electrochemical cell of claim 8 wherein said electrode is a centrally disposed electrode between two electrodes of opposite polarity with major surfaces of said centrally disposed electrode facing major surfaces of said electrodes of opposite polarity, said centrally disposed electrode comprising two porous substrates disposed parallel along inwardly facing, major surfaces and having layers of electronically insulative material over and in contact with said inwardly facing, major surfaces to bias the electrode reaction from the inwardly facing towards the outwardly facing, major surfaces of said centrally disposed electrode.

* * * * *